May 30, 1939.   W. WALTHER ET AL   2,160,241
IGNITION APPARATUS
Filed June 15, 1936
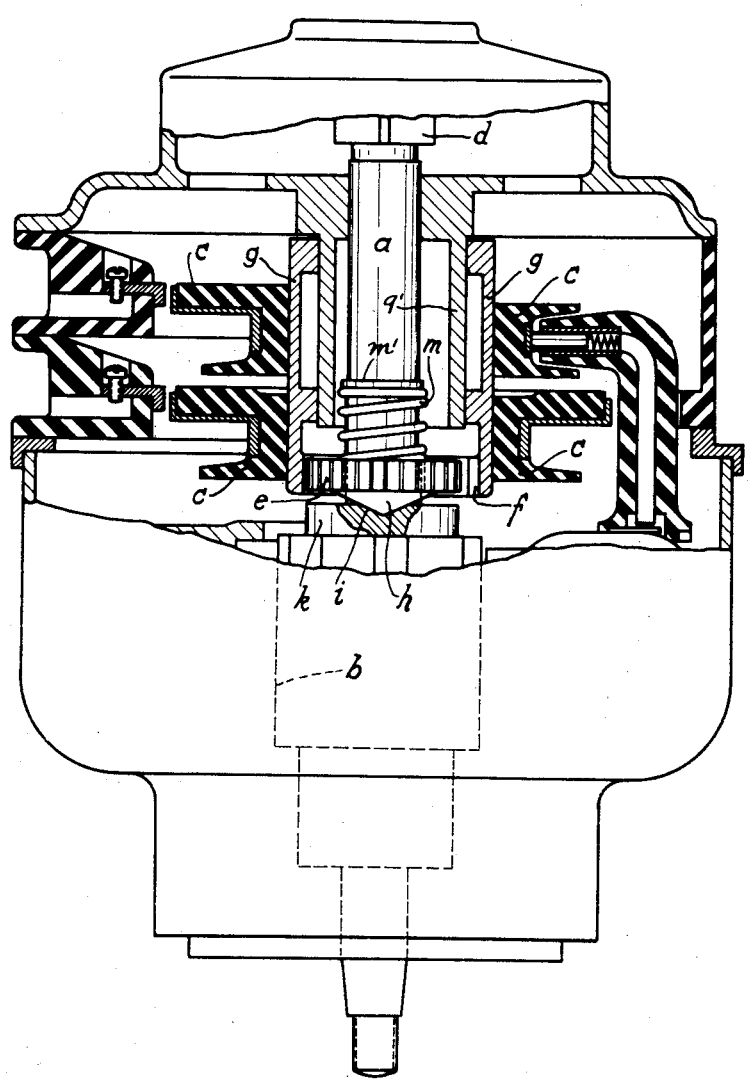
Inventor
Wilhelm Walther
Willi Hirsch
by Stewart & McKay
their attorneys Patented May 30, 1939

2,160,241

UNITED STATES PATENT OFFICE 2,160,241

IGNITION APPARATUS

Wilhelm Walther, Stuttgart, and Willi Hirsch, Fellbach, near Stuttgart, Germany, assignors to Robert Bosch Gesellschaft mit beschränkter Haftung Application June 15, 1936, Serial No. 85,412
In Germany June 27, 1935

4 Claims. (Cl. 200—19)

The present invention relates to a toothed wheel drive for the distributors of magnetos and other ignition apparatus, of the type wherein the distributor shaft driven through a transmission gear lies eccentrically of the magneto shaft and the driving wheel is arranged within the driven toothed wheel. The object of the invention is to damp shocks to the gear that are caused by irregular driving.

According to the invention, this is attained by a yielding or resilient connection between the driving shaft and the driving toothed wheel.

As an example of construction of the object of the invention, a twin magneto having a distributor for two ignition circuits is shown in section in the accompanying drawing.

In the drawing $a$ is the driving shaft of the magneto, which besides driving the magneto rotor $b$ also drives the distributor pieces $c$, of a distributor for two circuits, arranged eccentrically of the rotor, and furthermore, an interrupter $d$. Between the driving shaft and the distributor pieces a transmission gear is inserted, which consists of a toothed wheel $e$ on the shaft $a$ and an internally toothed wheel $f$ seated on a sleeve $g$, which carries the distributor pieces and which is rotatably mounted on a fixed sleeve $g'$ surrounding shaft $a$. The toothed wheel $e$ is loosely mounted on the shaft $a$ and has wedge-shaped projections $h$ on one side, which engage in corresponding depressions $i$ in a collar or flange $k$ of the shaft $a$, and is pressed by a strong spring $m$ against the collar, one end of said spring bearing against the toothed wheel $e$ and the other end bearing against an abutment $m'$ on the shaft $a$.

On sudden shocks in the drive, the toothed wheel $e$ can move axially against the pressure of the spring $m$ whereby the shocks are taken up by the spring. During normal drive the toothed wheel is pressed by the spring $m$ so strongly against the collar or flange $k$, that it is not moved by the power component of the driving shaft exerted in the axial direction acting on it.

The advantage of the invention is especially of value in apparatus in which, as in the example of construction, the mass of the distributor pieces to be moved is comparatively large and the toothed wheels are small and therefore have little springiness in themselves.

We declare that what we claim is:

1. In ignition apparatus including a distributor and a driving shaft, a transmission gear between said shaft and distributor including a toothed wheel loosely mounted on said driving shaft, a stop rim or flange on said shaft adjacent the toothed wheel, said toothed wheel and said stop rim having corresponding and inter-engaging wedge-shaped projections and depressions thereon, an abutment on said shaft and a spring between the abutment and the toothed wheel adapted to yieldingly hold the toothed wheel in engagement with the stop rim, said spring adapted to yield to permit limited relative rotation only between said toothed wheel and said stop rim to damp shocks in the drive.

2. In ignition apparatus including a distributor, a driving shaft having a rim or flange and an abutment thereon spaced longitudinally of the shaft, transmission gear between said distributor and shaft including a toothed gear loosely mounted on said shaft between said rim and said abutment, said gear and said rim having corresponding axially directed projections and depressions thereon and a spring on the shaft between said abutment and said toothed wheel adapted to hold said projections and depressions in engagement to transmit the drive and to permit limited relative displacement therebetween to cushion shocks in the drive.

3. In a magneto having a rotatable magneto shaft, a distributor, and means for drivably connecting said magneto shaft and said distributor comprising a gear wheel loosely mounted on said magneto shaft and meshing with an internally toothed ring carried by said distributor, a flange carried by said shaft adjacent said gear wheel, said gear wheel and flange having corresponding and inter-engaging wedge-shaped projections and depressions, and resilient means adapted to yieldingly hold said projections and depressions in engagement and to permit limited relative rotation only between said shaft and gear wheel to damp shocks in the drive.

4. In a magneto having a rotatable magneto shaft, a fixed sleeve surrounding said shaft, a distributor having a hollow shaft rotatably mounted on said fixed sleeve, and means for drivably connecting said magneto and distributor shafts comprising a gear wheel loosely mounted on said magneto shaft and meshing with an internally toothed ring carried by said distributor shaft, a flange carried by said magneto shaft adjacent said gear wheel, said gear wheel and flange having corresponding and inter-engaging wedge-shaped projections and depressions, and spring means carried by said magneto shaft adapted to yieldingly hold said projections and depressions in engagement and to permit limited relative rotation only between said magneto shaft and gear wheel and limited axial movement of said gear wheel relative to said toothed ring to damp shocks in the drive.

WILHELM WALTHER.
WILLI HIRSCH.